(12) United States Patent
Hoshi

(10) Patent No.: US 10,052,988 B2
(45) Date of Patent: *Aug. 21, 2018

(54) SEAT FRAME

(71) Applicant: TS TECH CO., LTD., Asaka-shi, Saitama (JP)

(72) Inventor: Masayuki Hoshi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,192

(22) Filed: Feb. 12, 2018

(65) Prior Publication Data

US 2018/0162249 A1    Jun. 14, 2018

Related U.S. Application Data

(62) Division of application No. 14/782,158, filed as application No. PCT/JP2014/060098 on Apr. 7, 2014, now Pat. No. 9,889,779.

(30) Foreign Application Priority Data

Apr. 8, 2013   (JP) .................... PCT/JP2013/060650

(51) Int. Cl.
*A47C 7/02*    (2006.01)
*B60N 2/68*    (2006.01)
(Continued)

(52) U.S. Cl.
CPC .............. *B60N 2/68* (2013.01); *B60N 2/682* (2013.01); *B60N 2/686* (2013.01); *B60N 2/7041* (2013.01); *B60N 2/72* (2013.01)

(58) Field of Classification Search
CPC .......... B60N 2/682; B60N 2/686; B60N 2/72; B60N 2/68; B60N 2/7041
(Continued)

(56) References Cited

U.S. PATENT DOCUMENTS 4,673,215 A    6/1987 Yokoyama
4,695,097 A    9/1987 Muraishi
(Continued)

FOREIGN PATENT DOCUMENTS

CN    101920675 A    12/2010
JP    2008-087578 A    4/2008
(Continued)

OTHER PUBLICATIONS

Office Action issued in related application CN 201480019005.7, dated Dec. 14, 2016, with machine generated English language translation, 16 pages.

*Primary Examiner* — Chi Q Nguyen
(74) *Attorney, Agent, or Firm* — Drinker Biddle & Reath LLP

(57) ABSTRACT

In a seat cushion frame which comprises side frames fixed to each of the two ends of a pan frame in the width direction, the rigidity of mounting the side frames to the pan frame is increased. In this seat cushion frame having a configuration in which side frames are fixed to both ends of the pan frame in the width direction, the side frame is fixed to the pan frame with a flange formed by bending the top part inwards in the width direction, and a recess recessed inwards in the width direction is formed in the portion of the flange that is fixed to the pan frame.

7 Claims, 7 Drawing Sheets

(51) Int. Cl.
*B60N 2/72* (2006.01)
*B60N 2/70* (2006.01)

(58) Field of Classification Search
USPC ............ 297/452.34, 452.33, 452.29, 452.23,
297/452.22, 452.18
See application file for complete search history.

(56) References Cited

U.S. PATENT DOCUMENTS

| | | | |
|---|---|---|---|
| 4,781,417 A | | 11/1988 | Shipman et al. |
| 5,318,350 A | * | 6/1994 | Okamoto ................ B60R 22/26 297/468 |
| 6,220,669 B1 | | 4/2001 | Frohnhaus et al. |
| 6,231,125 B1 | | 5/2001 | Maeda et al. |
| 6,619,739 B2 | | 9/2003 | McMillen |
| 6,619,750 B2 | | 9/2003 | Toyota et al. |
| 7,137,669 B2 | * | 11/2006 | Nagayama ................ A47C 7/02 297/452.49 |
| 9,835,479 B2 | * | 12/2017 | Endo ...................... G01D 11/30 |
| 9,889,779 B2 | * | 2/2018 | Hoshi ...................... B60N 2/68 |
| 2007/0057527 A1 | * | 3/2007 | Endo ...................... B60N 2/002 296/65.13 |
| 2008/0079296 A1 | * | 4/2008 | Endo ...................... B60N 2/002 297/217.2 |
| 2009/0139774 A1 | * | 6/2009 | Takayasu ................ B60N 2/002 177/136 |
| 2009/0301794 A1 | | 12/2009 | Endo et al. |

FOREIGN PATENT DOCUMENTS

| | | |
|---|---|---|
| JP | 2008-178533 A | 8/2008 |
| JP | 2012-214119 A | 11/2012 |

\* cited by examiner

FRONT ←——→ REAR

SEAT FRAME

CROSS REFERENCE TO RELATED APPLICATIONS

This application is a divisional of U.S. patent application Ser. No. 14/782,158, filed Oct. 2, 2015, now U.S. Pat. No. 9,889,779, which is a National Stage Entry application of PCT Application No. PCT/JP2014/060098, filed Apr. 7, 2014, which claims the priority benefit of PCT Application No. PCT/JP2013/060650, filed Apr. 8, 2013, the contents of all being incorporated herein by reference.

BACKGROUND

Disclosed herein is a seat frame, and specifically a seat frame having a structure in which a side frame is fixed to each of both end portions in the width direction of a pan frame.

A seat frame in which a side frame is fixed to each of the both end portions in the width direction of a pan frame has already been known as a seat frame structure, and such a structure is utilized for a frame of a vehicle seat, specifically, a frame for a seat cushion (hereinafter, referred to as a seat cushion frame). As an example thereof, in Japanese Patent Document No. 2012-214119 A ("the '119 Document"), disclosed is a seat cushion frame having a structure in which a pan frame is installed at the front end portion of a pair of side frames separated from each other in the right and left direction.

In order to appropriately mount the side frames to a pan frame, rigidity appearing on the side frame side, or more precisely, rigidity for mounting the side frame to the pan frame has to be secured.

Further, a connecting member by which a pair of side frames are connected with each other is provided in the seat cushion frame which has been disclosed in the '119 Document, but in cases where this connecting member and the side frame are joined to each other via welding, it is preferable that welding is performed at the portion where rigidity of the side frame can be expected to be further improved.

SUMMARY

Thus, various embodiments of the present invention are made in consideration of the above-described problem, and it is an object thereof to provide a seat frame for which rigidity for mounting the side frame to the pan frame is improved, as a seat frame having a structure in which the side frame is fixed to each of both end portions of the pan frame in the width direction of the pan frame.

Further, it is another object to further improve rigidity of the side frame in the seat frame having a configuration in which the connecting member with which the side frames are connected to each other, and the side frame are joined to each other via welding.

The problem is solved by a seat frame comprising a pan frame and a side frame fixed to each of both end portions in the width direction of the pan frame, wherein the side frame is fixed to the pan frame with a flange formed by bending an upper end portion of the side frame inward in the width direction, and a recess recessed inward in the width direction is formed in a portion of the flange that is fixed to the pan frame.

In the above-described seat frame, a recess is placed at the portion of the flange that is fixed to the pan frame, wherein the flange is formed at the upper end portion of the side frame. This recess is configured by bending the side frame. That is, a bent portion is formed in the side frame in order to provide the above-described recess, and rigidity of the recess and its surrounding area is improved via formation of this bent portion. Then, in the above-described seat frame, the side frame is fixed to the pan frame at the portion where rigidity is improved. In this way, in the above-described seat frame, the side frame is fixed to the pan frame at the high rigidity portion so that rigidity for mounting the side frame to the pan frame is improved.

Further, in the above-described seat frame, the recess can comprise a bottom portion positioned innermost in the width direction in the recess, the side frame can be fixed to the pan frame by welding to the pan frame a portion of the flange where the recess is positioned, and a welding region where the flange and the pan frame are welded is positioned more on an inner side than the bottom portion in the width direction and is formed along the bottom portion in a front to back direction of the seat frame.

In the above-described configuration, the welding region where the flange and the pan frame are welded is situated more on the inner side than the bottom portion of the recess, and is formed along the bottom portion. For this reason, rigidity of the above-described welding region and it surrounding area is increased, and as a result, rigidity for mounting the side frame to the pan frame is further improved.

Further, it is preferable that in the above-described seat frame, the recess in the front to back direction is longer in length than the welding region.

In the above-described configuration, the recess is longer in length than the welding region (that is, the welding mark) where the flange and the pan frame are welded so that a region protruding from the welding region is present in the recess. In this way, the load acting on the position where the side frame is mounted to the pan frame is dispersed by providing the region protruding from the welding region in the recess, and it becomes possible that concentration of the load to the welding region is suppressed.

Further, in the above-described seat frame, more preferable is the portion of the flange that is fixed to the pan frame comprising a first recess as the recess, and a second recess, wherein the first recess is positioned in front of the second recess in the front to back direction, and is recessed inward in the width direction more than the second recess; and the welding region comprising a plurality of welding regions formed at positions separated from each other in the front to back direction, wherein a first welding region among the plurality of the welding regions is at the same position as that of the first recess in the front to back direction, and a second welding region among the plurality of the welding regions is positioned behind the first welding region in the front to back direction, wherein a boundary position between a rear end portion of the first recess and a front end portion of the second recess is positioned between the first welding region and the second welding region in the front to back direction.

In the above-described configuration, the portion exhibiting comparatively low rigidity which is present at the rear end of the first recess in the side frame is disposed at the position caught between the welding regions which exhibit comparatively high rigidity. Consequently, it becomes possible that lowering of rigidity at the rear end portion of the first recess is suppressed.

Further, in the above-described seat frame, it is still more preferable that the seat frame comprises a connecting member that connects between the side frame fixed to one end portion in the width direction of the pan frame and the side frame fixed to the other end portion in the width direction of the pan frame, wherein the connecting member is joined to each of the side frames via welding, and at least a part of a joining region where the connecting member and the side frame are joined is positioned on the same side as that of the recess in relation to the connecting member.

In the above-described configuration, at least a part of a joining region where the connecting member and the side frame are joined, and the recess are positioned on the same side in relation to the connecting member. That is, in the side frame, the recess and the joining region, each of which exhibits higher rigidity, are both positioned on the same side in relation to the connecting member so that rigidity of the recess and its surrounding area is furthermore improved.

Further, in the above-described seat frame, it is even more preferable that the seat frame comprises the connecting member that connects between the side frame fixed to the one end portion in the width direction of the pan frame and the side frame fixed to the other end portion in the width direction of the pan frame, wherein the connecting member is joined to each of the side frames via welding, and a virtual plane passing through the recess among virtual planes passing through the center of the connecting member as viewed from the width direction passes through the joining region where the connecting member and the side frame are joined.

In the above-described configuration, a virtual plane passing through the recess among virtual planes passing through the center of the connecting member as viewed from the width direction always passes through the joining region where the connecting member and the side frame are joined. That is, the joining region where the connecting member and the side frame are joined is present on the virtual plane passing through the center of the connecting member, and the first recess, so that rigidity of the region expanding along the above-described virtual plane is improved.

Further, it is still more preferable that in the above-described seat frame, a region of a lower end portion of the side frame, that is positioned below the recess, projects outward further than the recess.

In the above-described configuration, the portion recessed for providing the recess in the side frame does not reach the lower end of the side frame, breaking off in the middle. In other words, unevenness is formed to the side frame at the position where the recess is placed in the front to back direction so that rigidity of the side frame is further improved via formation of the unevenness thereof.

A portion of a flange that is fixed to a pan frame, wherein the flange is formed at the upper end portion of a side frame, becomes a recess exhibiting high rigidity so that rigidity for mounting the side frame to the pan frame is increased.

Further, it becomes possible that rigidity is improved at a portion of the side frame that is welded to the pan frame, and its surrounding area.

Further, it becomes possible that concentration of a load to a welding region is suppressed by dispersing the load acting on the position where the side frame is mounted to the pan frame.

Further, as to the portion which is present at the rear end of a recess (the first recess) in the side frame, it becomes possible that lowering of rigidity is suppressed.

Further, in the side frame, rigidity of the recess and its surrounding area is further improved in response to the position relationship between the recess and a joining region where a connecting member with which the side frames are connected to each other, and the side frame are joined.

Further, in the side frame, rigidity of the region expanding along a virtual plane passing through the center of the region where the connecting member with which the side frames are connected to each other, and the recess is improved.

Further, in the side frame, unevenness is formed on the side wall at the position where the recess is placed in the front to back direction, so that rigidity of the side frame is further improved via formation of the unevenness thereof.

DETAILED DESCRIPTION

Next, a seat frame according to one embodiment (hereinafter, referred to as the present embodiment) of the present invention will be explained referring to FIGS. 1 to 7. In addition, embodiments described below are those for easily understanding the present invention, and the present invention is not limited thereto. Modifications and variations to the present invention can be made without departing from the spirit, and the present invention includes the equivalent thereof.

Figure 1:
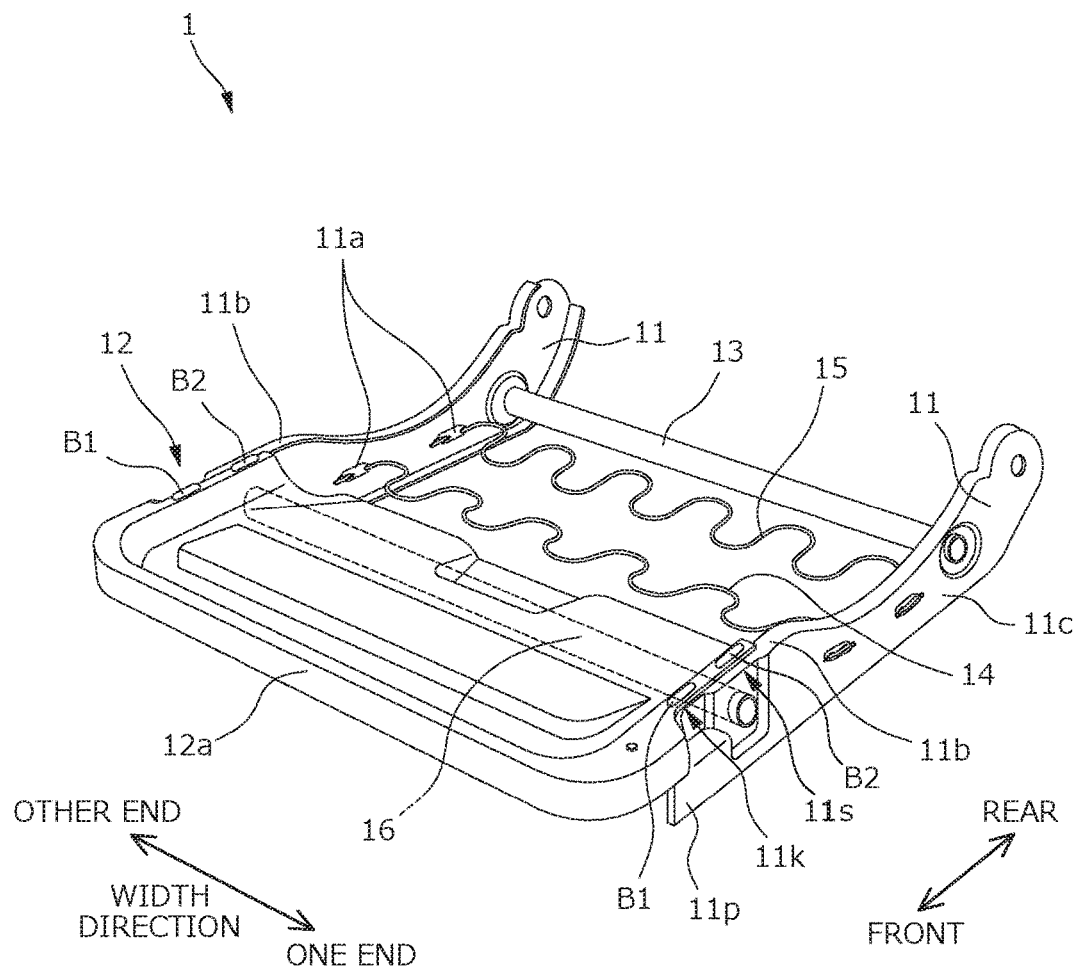
FIG. 1 is a schematic perspective view showing a seat cushion frame according to one embodiment of the present invention.

The seat frame according to the present embodiment is a frame for a vehicle seat, and specifically a frame 1 for a seat cushion S of the vehicle seat (hereinafter, referred to as a seat cushion frame). As shown in FIG. 1, this seat cushion frame 1 is provided mainly with a pair of right and left side frames 11, a pan frame 12, a member pipe 13, S springs 14 and 15 and a connecting pipe 16 corresponding to a connecting member, as constituent elements.

Figure 2:
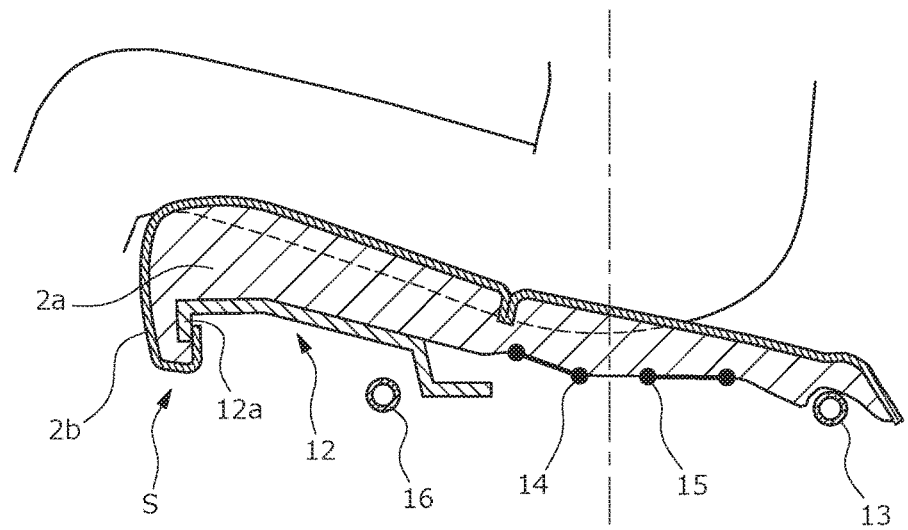
FIG. 2 is a schematic cross-sectional view showing a central area in the width direction of the seat cushion.

And as shown in FIG. 2, seat cushion frame 1 constitutes the pan frame 12 and a seat cushion S possessing cushion pads 2a and a cover material 2b covering the cushion pads 2 which are disposed on the S springs 14 and 15. In addition, in the case of a conventional vehicle seat, a seat back (not shown) is installed via a reclining mechanism (not shown) at the rear end portion of the seat cushion S. That is, a seat back frame (not shown) constituting a skeleton of the seat back is installed at the rear end portion of the seat cushion frame 1.

Next, a basic configuration of each of component parts for the seat cushion frame 1 will be described.

A pair of right and left side frames 11 is positioned at the both end portions in the width direction of the seat cushion frame 1, and the width of the seat cushion S is specified. Each of the side frames 11 is a sheet metal frame which is long in the front to back direction of the seat cushion frame 1. As shown in FIG. 1, the rear end portion of the side frame 11 is bent and extended obliquely upward. Then, as described before, a seat back frame is installed via a reclining mechanism at the rear end portion of the side frame 11.

Further, the upper end portion of each of the side frames 11 is bent inward by approximately 90 degrees in the width direction to form a flange 11b. In addition, in the present embodiment, the flange 11b is formed at the lower end portion of each of the side frames 11 in the similar manner, but at least, the flange 11b may be formed at the upper end portion, and the flange 11b may not be formed at the lower end portion. In addition, a driving unit (not shown) in which a set of gear rings and an operation lever for driving a height adjustment mechanism to adjust height of a vehicle seat are unitized is attached onto the outer surface of a side wall 11c of one side frame 11 of a pair of right and left side frames 11, wherein the one side frame is situated on the side nearer to a vehicle door.

Further, as shown in FIG. 1, a member pipe 13, S springs 14 and 15, and a connecting pipe 16 are disposed between the side frames 11, and the side frames 11 are connected to each other with these component parts. More specifically, a mounting hole for the member pipe 13 is formed at the rear end portion of each of the side frames 11, and a member pipe 13 is mounted to each of the side frames 11 with fastening parts such as bolts, pins, and so forth, that are inserted in the mounting hole. Further, as shown in FIG. 1, convex portions 11a having a through-hole are formed in the region of the inner wall surface of each of the side frames 11, wherein the region is situated in front of the member pipe 13, and end portions of the S springs 14 and 15 are locked to through-holes of such convex portions 11a to mount the S springs 14 and 15 to each of the side frames 11.

Figure 3:
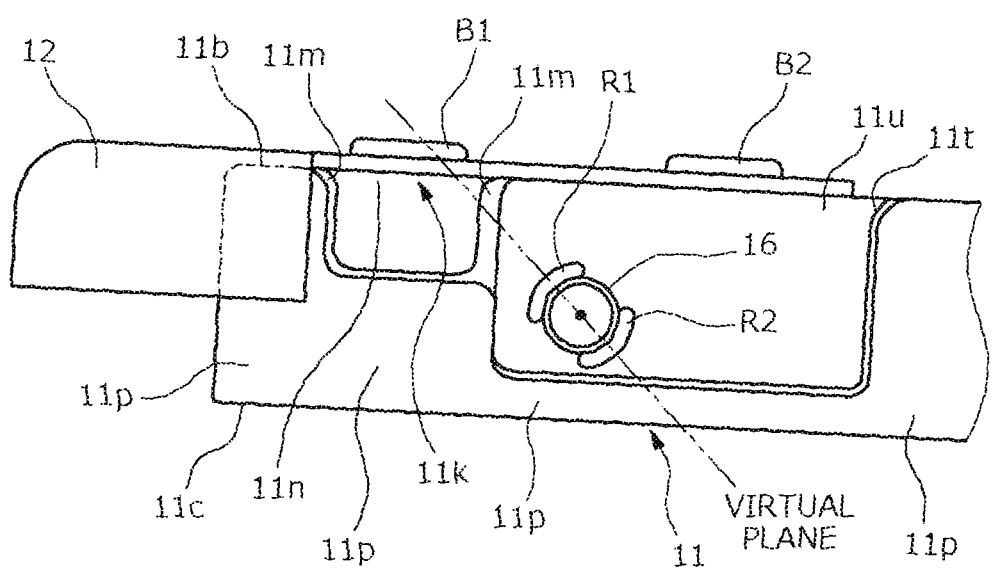
FIG. 3 is a side view showing a configuration of the periphery of a recess.

Further, a mounting hole is formed at the front end portion of each of the side frames 11. The end portion of the connecting pipe 16 is inserted in this mounting hole, and the outer edge portion of the mounting hole and the outer peripheral surface of the connecting pipe 16 are joined to each other via welding. Thus, the connecting pipe 16 is mounted to each of the side frames 11. In addition, concerning the joining region where the side frame 11 and the connecting pipe 16 are joined, that is, the welding mark, there are two welding marks at the position symmetrical to the center of the connecting pipe 16. Specifically, as shown in FIG. 3, each of the welding marks is approximately ¼ arc-shaped, and is provided in the range of 80 to 180 degrees and the range of 260 to 360 degrees, when a virtual line vertically passing through the upper end flange 11b of the side frame 11 from the center of the connecting pipe 16 is set to a base (the position at 0 degree).

The pan frame 12 is a rectangular sheet metal frame which is long in the width direction in the planar view, and is installed at the front end portions of a pair of right and left side frames 11. That is, the front end portions of the side frames 11 are fixed to the both end portions in the width direction of the pan frame 12. More specifically, each of the side frames 11 is fixed to the pan frame 12 by welding the flanges 11b formed at the upper end to the both end portions in the width direction of the pan frame 12. Herein, the width direction of the pan frame 12 is a direction identical to the width direction of the seat cushion frame 1.

In addition, in the state where the side frame 11 is fixed to the pan frame 12, both ends in the width direction of the pan frame 12 are positioned more on the inner side than the outside end of the side frame 11 (precisely, the flange 11b formed at the upper end of the side frame 11).

Further, as shown in FIG. 2, the front end portion 12a of the pan frames 12 is bent downward by approximately 90 degrees, and the end portion of the cover material 2b is locked to the lower end portion by a commonly known locking method.

Further, as shown in FIGS. 1 and 2, a connecting pipe 16 as a connecting member is disposed at the position located below the pan frame 12. This connecting pipe 16 is provided to suppress a submarine phenomenon in rear surface collision, that is, a phenomenon in which a passenger remaining seated is sunken downward in rear surface collision, and is a cylindrical pipe in the present embodiment. Thus, as described before, the connecting pipe 16 according to the present embodiment is in a state where the both end portions are inserted in a mounting hole formed at the front end portion of each of the side frames 11, and is welded to each of the side frames 11 via welding.

Next, the characteristic configuration of the seat cushion frame 1 according to the present embodiment will be described, referring to FIGS. 1, 3 and 4. In addition, in the present embodiment, the side frame 11 situated on one side in the width direction is almost in the same configuration as that of the side frame 11 situated on the other side in the width direction, and only the configuration of one side frame 11 (a side frame 11 situated on one side in the width direction) will be described, unless otherwise specified.

In the present embodiment, as illustrated in FIG. 1 and FIG. 3, the first recess 11k as a recess, and the second recess 11s are formed at the portion of the flange 11b formed at the upper end of the side frame 11, wherein the portion is fixed to the pan frame 12. Herein, the first recess 11k and the second recess 11s are portions of the flange 11b, wherein the portions are configured by being recessed inward in the width direction.

Further, in the present embodiment, two recesses (the first recess 11k and the second recess 11s) are placed at different positions from each other in the front to back direction of the seat cushion frame 1. More specifically, as shown in FIG. 1 and FIG. 3, the first recess 11k is placed slightly behind the front end of the side frame 11 in the front to back direction. On the other hand, the second recess 11s is placed at the position situated behind the first recess 11k, and situated adjacent to the first recess 11k in the front to back direction.

A detailed explanation concerning the first recess 11k will be given. The first recess 11k is formed by recessing the portion of the side wall 11c of the side frame 11 inward in the width direction, the portion extending from the upper end to roughly the center of the side wall 11c in the up-and-down direction. Thus, the first recess 11k which is lateral U-shaped in the planer view is formed for the flange 11b. In addition, in the present embodiment, as shown in FIG. 4, the first recess 11k is recessed inward in the width direction more than the second recess 11s.

Figure 5:
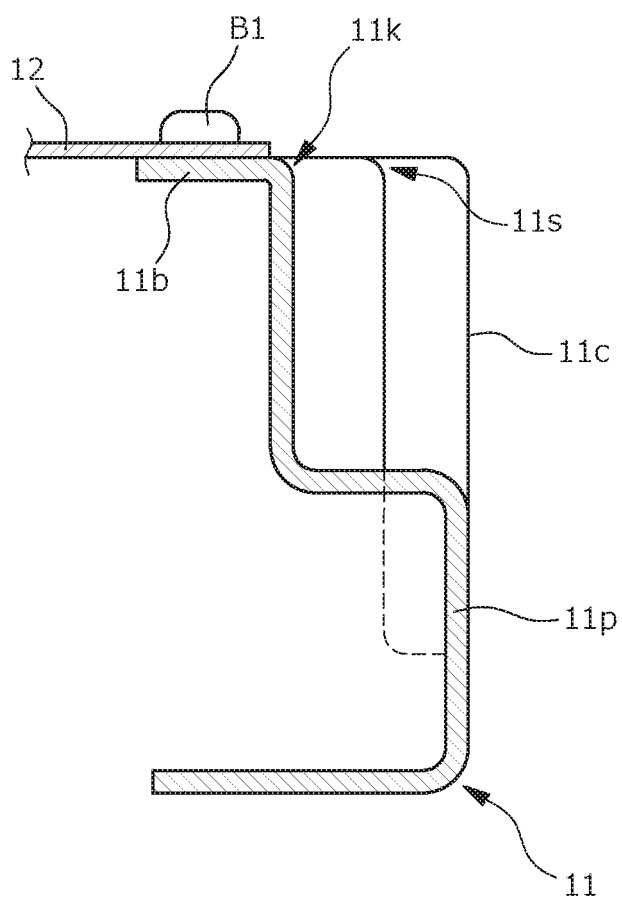
FIG. 5 is a schematic cross-section diagram showing A-A cross-section in FIG. 7.

On the other hand, as shown in FIG. 5, a protruding portion 11p is formed in the lower end portion of the side wall 11c of the side frame 11, more precisely, in the region situated at the position below the first recess 11k. Further, the protruding portion 11p is also formed in the portion of the side wall 11c, that is positioned in front of the first recess 11k. Herein, the protruding portion 11p means a portion protruding outward in the width direction more than the first recess 11k and the second recess 11s, and corresponds to the portion which is not recessed in the side wall 11c of the side frame 11. In addition, as long as the protruding portion 11p protrudes outward in the width direction more than the first recess 11k and the second recess 11s, the portion recessed slightly inward in the width direction may be designated as the protruding portion 11p, or the portion where the unevenness is formed by providing beads and so forth may be designated as the protruding portion 11p.

The configuration of the first recess 11k will be described in more details, referring to FIG. 4. The first recess 11k comprises a pair of inclined portions 11m which are situated opposed to each other and inclined toward the inside in the width direction, and a bottom portion 11n which is formed between the inclined portions 11m and situated on the innermost side in the width direction in the first recess 11k. This bottom portion 11n extends along the front to back direction. The angle portion made by the inclined portion 11m and the bottom portion 11n in the first recess 11k may be a curved R-shaped angle portion, or may be an acute angle portion.

Next, an explanation concerning the second recess 11s will be given. The second recess 11s is formed by recessing a portion of the side wall 11c of the side frame 11 inward in the width direction, the portion extending from the upper end to more or less the upper position rather than the lower end in the up-and-down direction. In addition, in the present embodiment, as shown in FIG. 3, the portion to which the connecting pipe 16 is joined (that is, a portion where a mounting hole for inserting the connecting pipe 16 are formed) is included within the range recessed for forming the second recess 11s of the side wall 11c of the side frame 11.

Further, the protruding portion 11p is formed in a region at the lower end portion of the side wall 11c of the side frame 11, the region situated at the position below the second recess 11s. Further, in the present embodiment, the protruding portion 11p is also formed in a portion of the side wall 11c, that is adjacent to the second recess 11s, and situated behind the second recess 11s.

The configuration of the second recess 11s will be described in detail, referring to FIG. 3 and FIG. 4. The second recess 11s possesses a bottom portion 11u adjacent to the inclined portion 11m on the rear side, which is provided by the first recess 11k, and an inclined portion 11t adjacent to the bottom portion 11u on the opposite side of the inclined portion 11m of the first recess 11k. This bottom portion 11u extends along the front to back direction.

As described above, in the present embodiment, a plurality of recesses, that is, the first recess 11k and the second recess 11s are provided for the flange 11b placed at the upper end of the side frame 11. Thus, rigidity of the flange 11b of the side frame 11 is improved. In other words, a portion which is bent to provide a recess for the flange 11b is present to the side wall 11c of the side frame 11. On the other hand, rigidity of the side frame 11 is further improved at the bent portion and its surrounding area. In the present embodiment, rigidity of the flange 11b of the side frame 11, specifically the portion fixed to the pan frame 12 is improved by providing the recess in this way. Further, in the present embodiment, two recesses having a different recess degree are formed in such a way that they are adjacent to each other in front and behind. Thus, it becomes possible that rigidity of the side frame 11 is efficiently improved.

In addition, in the side frame 11 according to the present embodiment, the protruding portion 11p is formed at a region of the lower end portion of the side wall 11c, the region situated below each of the first recess 11k and the second recess 11s. That is, in the present embodiment, the portion recessed for forming each of the recesses in the side wall 11c of the side frame 11 does not reach the lower end of the side wall 11c, breaking off in the middle. In other words, unevenness is formed to the side wall 11c at the position where each of the recesses is placed in the front to back direction so that rigidity of the side frame 11 is further improved via formation of the unevenness thereof.

And now, as described before, the side frame 11 is fixed to the pan frame 12 with the flange 11b placed at the upper end portion (precisely, on the upper surface of the flange 11b). Then, in the present embodiment, the first recess 11k and the second recess 11s as described before are formed at the portion of the flange 11b, that is fixed to the pan frame 12. In other words, the side frame 11 according to the present embodiment is fixed to the pan frame 12 at the portion of the flange 11b where the recesses (the first recess 11k and the second recess 11s) exhibiting higher rigidity are formed. Thus, rigidity for mounting the side frame 11 to the pan frame 12 is improved.

More specifically, when the side frame 11 is fixed to the pan frame 12, the flange 11b of the side frame 11 is chosen as a mounting portion for the purpose of fixing at the portion exhibiting high rigidity for mounting. In the present embodiment, the side frame 11 is mounted to the pan frame 12 at the portion where the recess exhibiting particularly high rigidity in this regard is formed. It becomes possible that the state where the side frame 11 is fixed to the pan frame 12 is stabilized by mounting the side frame 11 to the pan frame 12 at the portion exhibiting high rigidity in this way. The above-described effect is especially effective for the case when with the miniaturization of the seat, the side frame 11 is subjected to thinning and light-weighting.

The explanation concerning a method of fixing the side frame 11 to the pan frame 12 will be given. A portion of the flange 11b of the side frame 11 is welded to the pan frame 12, the portion where the recess is positioned in the front to back direction. In this way, rigidity of the welding region of each of the frames, and its surrounding area is improved by using a fixing method applied between the frames. Thus, it becomes possible that rigidity of the side frame 11 is further improved. In addition, the welding region means a welding mark, more specifically welding beads.

A more detailed explanation concerning the welding region will be given. Two welding regions are present on each of one end side and the other end side of the seat cushion frame 1, and the two welding regions are present at the positions separated from each other in the front to back direction of the seat cushion frame 1. As shown in FIG. 4, one of the two welding regions (hereinafter, referred to as the first welding region B1) is situated at the same position as that of the first recess 11k in the front to back direction.

More precisely, the first welding region B1 is situated more on the inner side than the bottom portion 11n of the first recess 11k in the width direction, and is formed along the bottom portion 11n (that is, formed to be extended long in the front to back direction). In this way, if the first welding region B1 is formed long in the front to back direction along the bottom portion 11n, it becomes possible that the length of the first welding region B1 is acquired in the front to back direction. Consequently, rigidity of the first welding region B1 and its surrounding area is increased, and rigidity for mounting the side frame 11 to the pan frame 12 is further improved.

Further, in the present embodiment, the first welding region B1 is formed within the existence range of the portion of the flange 11b where the first recess 11k is positioned in the front to back direction. In other words, the first recess 11k is longer in length than the first welding region B1 in the front to back direction. In addition, the length of the first recess 11k means an opening width of the first recess 11k, that is, a distance between the outer ends in the width direction of the inclined portion 11m.

As described above, a region protruding in front of the first welding region B1 and another region protruding behind the first welding region B1 are present at the portion of the flange 11b where the first recess 11k is positioned in the front to back direction. In this way, the load acting toward the side frame 11 from the pan frame 12 is dispersed by providing the regions protruding from the first welding region in front of and behind the first recess 11k so that it becomes possible that concentration of the load to the first welding region B1 is suppressed.

In addition, as a configuration which is different from the present embodiment, a configuration may be employed in which the first recess 11k in the front to back direction of the seat cushion frame 1 is shorter in length than the first welding region B1. In the case of such a configuration, it becomes possible to produce the effect by which rigidity is improved via formation of the welding region in place of the effect of suppressing the concentration of the load to the first welding region B1 by making the length of the first welding region B1 to be longer than the length of the first recess 11k.

Figure 4:
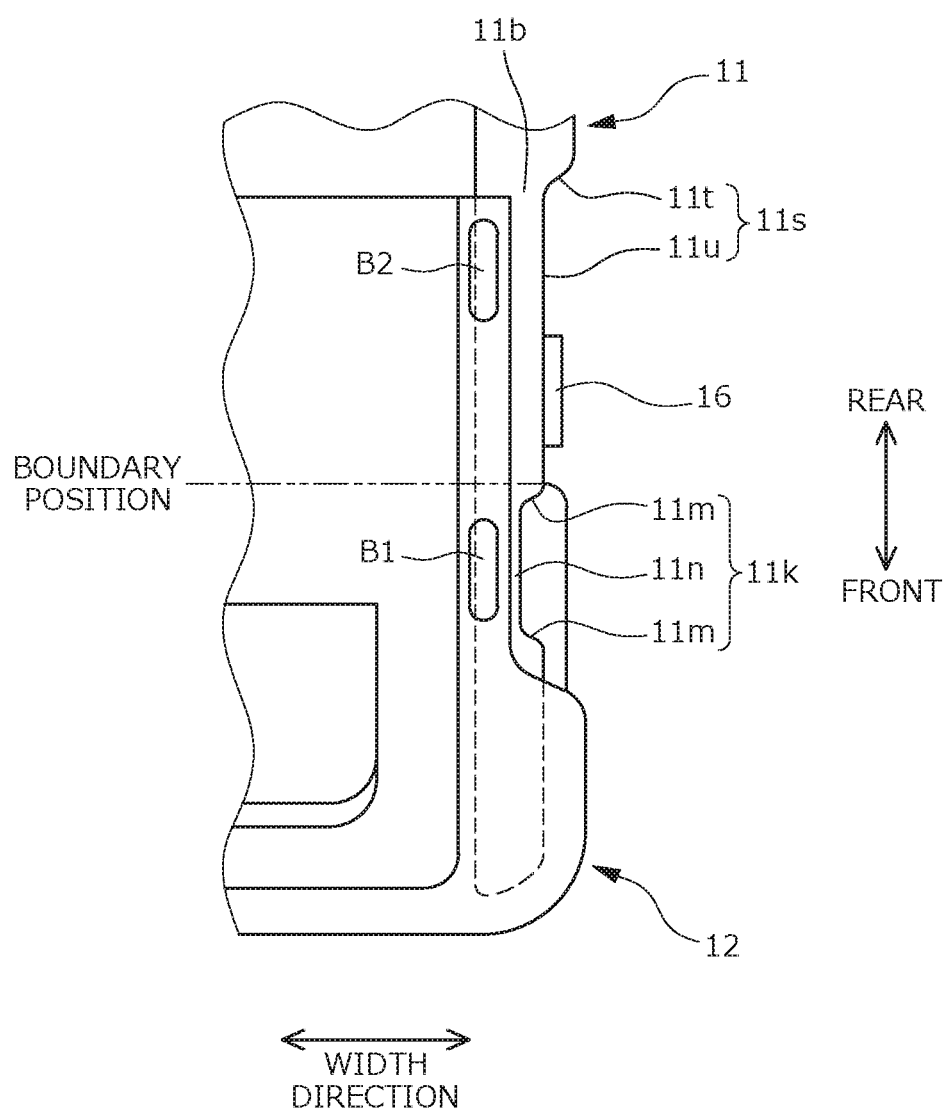
FIG. 4 is a top view of a welding region of the pan frame and the side frame as viewed from above.

The other welding region (hereinafter, referred to as the second welding region B2) of the two welding regions is positioned behind the first welding region B1 in the flange 11b in the front to back direction as shown in FIG. 3 and FIG. 4. In the present embodiment, the second welding region B2 is positioned more or less behind the mounting portion of the connecting pipe 16 as a connecting member in the side frame 11 in the front to back direction.

Figure 6:
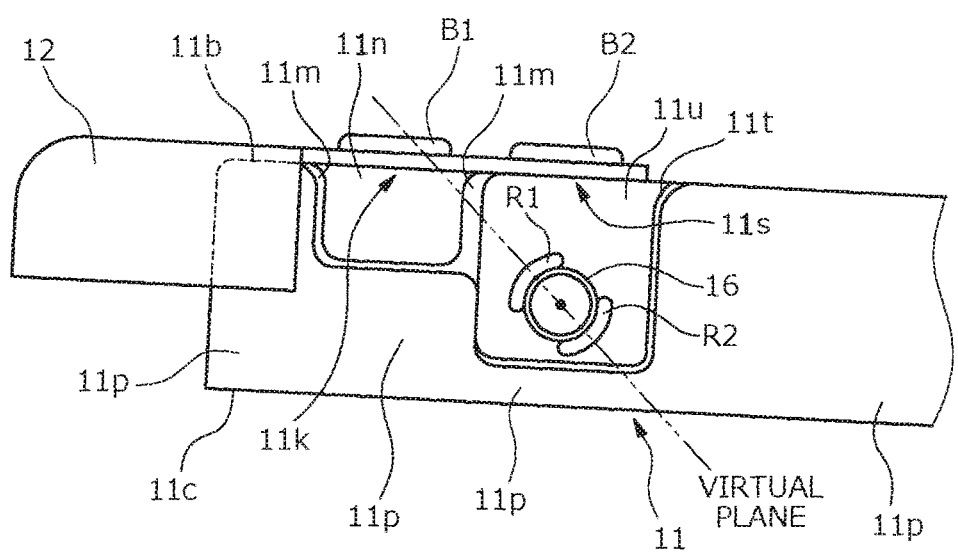
FIG. 6 is a side view showing a seat cushion frame according to a modified example.
Figure 7:
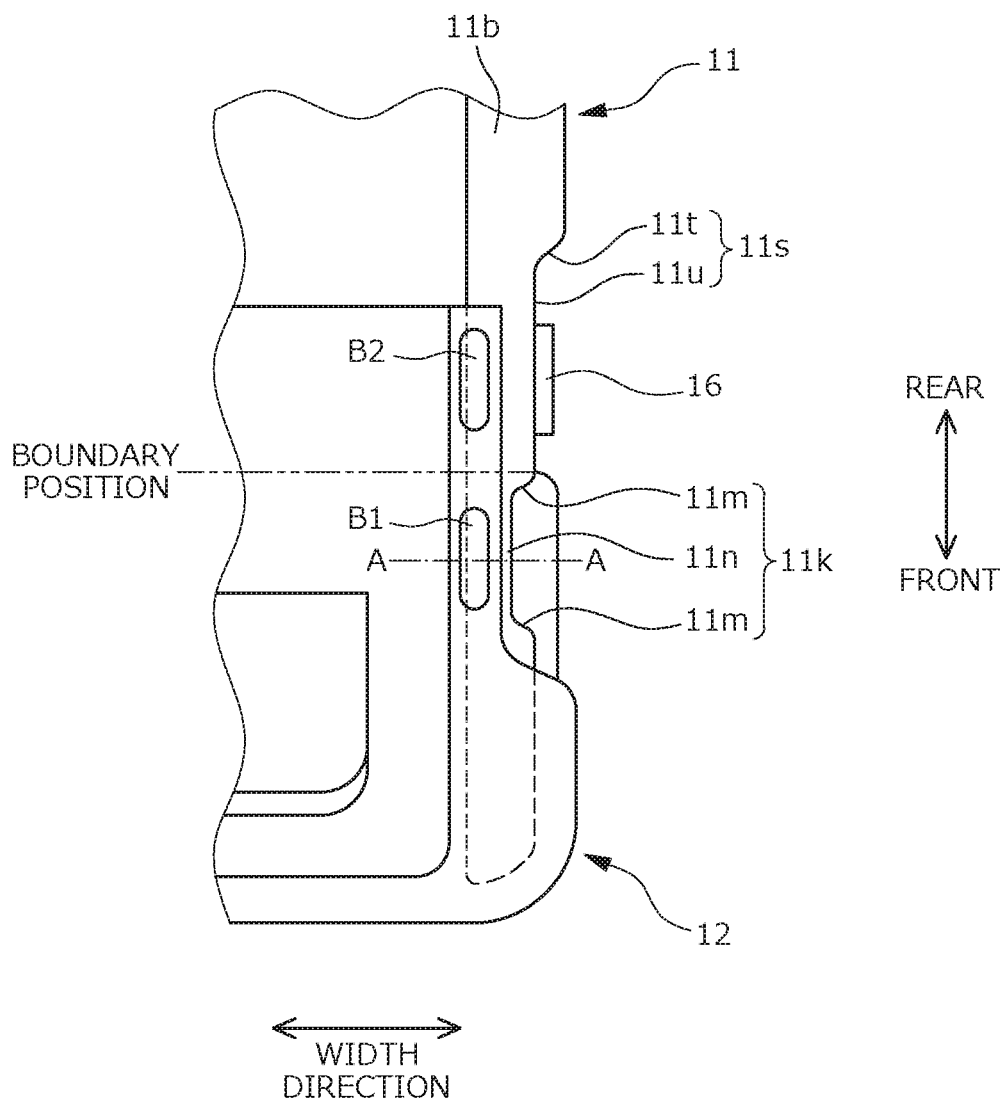
FIG. 7 is a top view of a welding region of the pan frame and the side frame as viewed from above, according to a modified example.

In addition, as to the position where the second welding region B2 is formed, it is not limited to the position shown in FIG. 3 and FIG. 4, and for example, as shown in FIG. 6 and FIG. 7, it may be the position situated directly above the portion where the connecting pipe 16 is mounted in the side frame 11 in the front to back direction. In the case of such a position, rigidity of the second welding region B2 and its surrounding area is further improved.

Further, in the present embodiment, as shown in FIG. 4, the boundary position (the position indicated by a two-dot chain line in FIG. 4) between the rear end portion of the first recess 11k and the front end portion of the second recess 11s is present between the first welding region B1 and the second welding region B2 in the front to back direction of the seat cushion frame 1. Herein, rigidity tends to be lowered at the rear end portion of the first recess 11k in the side frame 11. Thus, in the present embodiment, it becomes possible that lowering of rigidity at the rear end portion of the first recess 11k is suppressed by putting the rear end portion of the first recess 11k between the portions exhibiting high rigidity where the welding regions B1 and B2 are formed, in the front to back direction.

In the present embodiment, the connecting pipe 16 and the side frame 11 are joined to each other via welding, and, as described before, two joining regions are present along the outer peripheral surface of the connecting pipe 16. Of these, the joining region situated on the upper side (hereinafter, referred to as the first joining region R1) is positioned on the same side as that of the first recess 11k in relation to the connecting pipe 16. That is, in the present embodiment, at least a part of the joining region where the connecting pipe 16 and the side frame 11 are joined is positioned on the same side as that of the first recess 11k in relation to the connecting pipe 16. In this way, in the side frame 11, the first recess 11k and the first joining region R1 which contribute to improving rigidity are both positioned on the same side in relation to the connecting pipe 16 so that rigidity of the first recess 11k and its surrounding area is further improved.

The position relationship between the first joining region R1 and the first recess 11k will be described in more detail, referring to FIG. 3. A virtual plane (the surface indicated by a two-dot chain line in FIG. 3) passing through the first recess 11k among virtual planes passing through the center of the connecting pipe 16, as viewed from the width direction of the seat cushion frame 1, always passes through the first joining region R1 and a joining region paired with the first joining region R1 (hereinafter, referred to as a second joining region R2). Herein, the virtual plane passing through the first recess 11k means a virtual plane passing by any of the portions in the first recess 11k (specifically, the inclined portion 11m and the bottom portion 11n).

In the present embodiment, according to the position relationship as described above, it is possible to further improve rigidity of the side frame 11. Specifically, the joining regions R1 and R2 where the connecting pipe 16 and the side frame 11 are joined are present in the region expanding along the virtual plane passing through the center of the connecting pipe 16, and the first recess 11k. In this way, rigidity of the region expanding along the above-described virtual plane is improved by making the first joining region R1 and the second joining region R2 present in the region expanding along the virtual plane passing through the center of the connecting pipe 16, and the first recess 11k in the side frame 11.

Moreover, in cases where each of the joining regions R1 and R2 where the connecting pipe 16 and the side frame 11 are joined comes close to the welding region (precisely, the second welding region B2) where the side frame 11 and the pan frame 12 are welded, rigidity is furthermore improved. For this reason, as shown in FIG. 4 and FIG. 6, at least a part of each of the joining regions R1 and R2 is positioned above the center position of the connecting pipe 16 in the up-and-down direction.

According to the configuration having been given by the above-described explanation, in the seat cushion frame 1 according to the present embodiment, rigidity of the side frame 11, specifically, rigidity of the portion welded to the pan frame 12 is secured. From this result, the side frame 11 is fixed at the both end portions in the width direction of the pan frame 12, and it becomes possible that such a fixing state is securely held.

TABLE OF REFERENCE NUMERALS

S Seat cushion
1 Seat cushion frame
2a Cushion pad
2b Cover material
11 Side frame
11a Convex portion
11b Flange
11c Side wall
11k First recess
11m Inclined portion
11n Bottom portion
11s Second recess
11t Inclined portion
11u Bottom portion
11p Protruding portion
12 Pan frame
12a Front end portion
13 Member pipe
14 S spring
15 S spring
16 Connecting pipe B1 First welding region
B2 Second welding region
R1 First joining region
R2 Second joining region

What is claimed is:

1. A seat frame comprising:
a pan frame; and
a side frame fixed to each of both end portions in a width direction of the pan frame, wherein:
the side frame comprises a flange formed by bending an upper end portion of the side frame inward in the width direction;
the pan frame is fixed to the flange;
first and second recesses, recessed inward in the width direction, are formed in a portion of the flange that is fixed to the pan frame;
the second recess is positioned at a rear of the first recess and adjacent to the first recess in a front to back direction of the seat frame; and
the first recess is recessed inward in the width direction more than the second recess.

2. The seat frame according to claim 1, wherein:
the first recess comprises a bottom portion positioned innermost in the width direction in the first recess;
the side frame is fixed to the pan frame by welding to the pan frame one or more portions of the flange where the first recess or the second recess is positioned; and
a welding region where the flange and the pan frame are welded is positioned more on an inner side than the bottom portion in the width direction and is formed along the bottom portion in the front to back direction of the seat frame.

3. The seat frame according to claim 2, wherein a portion of the first recess and a portion of the welding region are arranged at a same position in the front to back direction.

4. The seat frame according to claim 2, wherein:
the seat frame comprises a plurality of welding regions formed at positions separated from each other in the front to back direction and that includes the welding region as a first welding region;
the first welding region among the plurality of welding regions is positioned at the same position as that of the first recess in the front to back direction;
a second welding region among the plurality of welding regions is positioned behind the first welding region in the front to back direction; and
a boundary position between a rear end portion of the first recess and a front end portion of the second recess is positioned between the first welding region and the second welding region in the front to back direction.

5. The seat frame according to claim 1, wherein:
the seat frame comprises a connecting member that connects between the side frame fixed to one end portion in the width direction of the pan frame and the side frame fixed to another end portion in the width direction of the pan frame;
the connecting member is joined to each of the side frames via welding; and
at least a part of a joining region where the connecting member and the side frame are joined is positioned on a same side as that of the first recess in relation to the connecting member.

6. The seat frame according to claim 1, wherein:
the seat frame comprises a connecting member that connects between the side frame fixed to one end portion in the width direction of the pan frame and the side frame fixed to another end portion in the width direction of the pan frame;
the connecting member is joined to each of the side frames via welding; and
a virtual plane passing through the first recess among virtual planes passing through a center of the connecting member, as viewed from the width direction, passes through the joining region where the connecting member and the side frame are joined.

7. The seat frame according to claim 1, wherein a region of a lower end portion of the side frame, that is positioned below the first recess and the second recess, projects outward further than the first recess and the second recess.

* * * * *